United States Patent
Salazar Prieto et al.

(10) Patent No.: US 10,259,403 B2
(45) Date of Patent: Apr. 16, 2019

(54) COLLAPSIBLE SOUND INSULATOR FOR A PRESSURE RELIEF VALVE THAT RELIEVES PRESSURE IN A CABIN OF A VEHICLE

(71) Applicant: GM GLOBAL TECHNOLOGY OPERATIONS LLC, Detroit, MI (US)

(72) Inventors: Felipe Guillermo Salazar Prieto, Naucalpan de Juarez (MX); Juan Carlos Lozano Amaro, Tultitlan (MX); Alberto Marquez Guadarrama, Metepec (MX)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 38 days.

(21) Appl. No.: 15/709,919

(22) Filed: Sep. 20, 2017

(65) Prior Publication Data

US 2019/0084501 A1 Mar. 21, 2019

(51) Int. Cl.
*B60R 13/08* (2006.01)
*B60H 1/24* (2006.01)

(52) U.S. Cl.
CPC ......... *B60R 13/0815* (2013.01); *B60H 1/248* (2013.01); *B60H 1/249* (2013.01); *B60R 13/0884* (2013.01)

(58) Field of Classification Search
CPC .......... B60H 1/24; B60H 1/248; B60H 1/249; B60R 13/0815; B60R 13/0884; B62D 25/24

USPC ........................................... 296/39.3, 190.09
See application file for complete search history.

(56) References Cited

U.S. PATENT DOCUMENTS 6,106,045 A * 8/2000 Gac ..................... B60R 13/02
296/190.09
7,823,693 B2 * 11/2010 Boyce ................. B60R 13/0815
181/284

FOREIGN PATENT DOCUMENTS

| EP | 0365395 A1 * | 4/1990 | ............. B60H 1/248 |
| FR | 2566339 A1 * | 12/1985 | ............. B60H 1/248 |
| WO | WO-2012021366 A2 * | 2/2012 | ............. B60H 1/249 |

* cited by examiner

Primary Examiner — Jason S Daniels

(57) ABSTRACT

A sound insulator for a vehicle cabin pressure relief valve includes a first wall, a second wall, and a third wall. The first wall is configured to inhibit sound from travelling in a lateral direction from the pressure relieve valve to a passenger compartment in the vehicle cabin. The second wall projects from the first wall and is configured to inhibit sound from travelling in a first longitudinal direction from the pressure relieve valve to the passenger compartment. The second wall is oriented at a first angle relative to the first wall. The third wall projects from the first wall and is configured to inhibit sound from travelling in a vertical direction from the pressure relieve valve to the passenger compartment. The third wall is oriented at a second angle relative to the first wall. The first and second angles are adjustable without damaging the sound insulator.

20 Claims, 4 Drawing Sheets

COLLAPSIBLE SOUND INSULATOR FOR A PRESSURE RELIEF VALVE THAT RELIEVES PRESSURE IN A CABIN OF A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to collapsible sound insulators for a pressure relief valve that relieves pressure in a cabin of a vehicle.

When a door of the vehicle is shut, the pressure in the passenger compartment of the vehicle increases abruptly. This abrupt pressure increase may be uncomfortable and displeasing to occupants of the vehicle. To address this, some vehicle manufacturers have designed vehicles to slightly open a window of a door when the door is open, and then close the window after the door is shut. Opening the window allows air to escape the vehicle and thereby prevents the pressure in the passenger compartment from increasing when the door is shut.

Another method of preventing an abrupt pressure increase in the passenger compartment when a door is shut involves a pressure relief valve mounted in the body of the vehicle. A pressure relief valve acts as a one-way valve that allows air to escape the passenger compartment while preventing the flow of air and other substances from the outside environment into the passenger compartment. However, some exterior sounds (e.g. road noise) may enter the passenger compartment through the pressure relief valve. Thus, a sound insulator may be placed around the pressure relief valve to inhibit exterior sounds from entering the passenger compartment through the pressure relief valve.

SUMMARY

The present disclosure describes a sound insulator for a pressure relief valve that relieves pressure in a cabin of a vehicle. In one example, the sound insulator includes a first wall, a second wall, and a third wall. The first wall is configured to inhibit sound from travelling in a lateral direction from the pressure relieve valve to a passenger compartment in the vehicle cabin. The second wall projects from the first wall and is configured to inhibit sound from travelling in a first longitudinal direction from the pressure relieve valve to the passenger compartment. The second wall is oriented at a first angle relative to the first wall. The third wall projects from the first wall and is configured to inhibit sound from travelling in a vertical direction from the pressure relieve valve to the passenger compartment. The third wall is oriented at a second angle relative to the first wall. The first and second angles are adjustable without damaging the sound insulator In one example, the first and second angles are zero when the sound insulator is formed.

In one example, the first wall has a first surface configured to face away from the pressure relief valve, the second wall has a second surface configured to face away from the pressure relief valve and oriented at the first angle relative to the first surface, and the third wall has a third surface configured to face away from the pressure relief valve and oriented at the second angle relative to the first surface.

In one example, the sound insulator further includes a first hinge and a second hinge. The first hinge connects the second wall to the first wall and allows the second wall to pivot relative to the first wall. Pivoting the second wall relative to the first wall changes the first angle. The second hinge connects the third wall to the first wall and allows the third wall to pivot relative to the first wall. Pivoting the third wall relative to the first wall changes the second angle.

In one example, the first hinge is defined by a first plurality of cuts in at least one of the first and second walls at a first intersection between the first and second walls, and the second hinge is defined by a second plurality of cuts in at least one of the first and third walls at a second intersection between the first and third walls.

In one example, the sound insulator further includes a retaining tab projecting from the second wall. The third wall defines an aperture configured to receive the retaining tab. The retaining tab maintains each of the first and second angles at a nonzero value when the retaining tab is inserted into the aperture.

In one example, when the retaining tab projecting from the second wall is inserted into the aperture in the third wall, the first angle is less than 90 degrees and the second angle is greater than 90 degrees.

In one example, the sound insulator further includes a fourth wall projecting from the first wall and configured to inhibit sound from travelling from the pressure relieve valve to the passenger compartment in a second longitudinal direction opposite of the first longitudinal direction.

In another example, the sound insulator includes a first wall, a second wall, a third wall, a first hinge, and a second hinge. The first wall has a first edge and a second edge intersecting the first edge. The second wall projects from the first edge of the first wall. The third wall projects from the second edge of the first wall. The first hinge connects the second wall to the first edge of the first wall and allows the second wall to pivot about a first pivot axis parallel to the first edge. The second hinge connects the third wall to the second edge of the first wall and allows the third wall to pivot about a second pivot axis parallel to the second edge.

In one example, the first hinge is defined by a first plurality of cuts in at least one of the first and second walls at a first intersection between the first and second walls, and the second hinge is defined by a second plurality of cuts in at least one of the first and third walls at a second intersection between the first and third walls.

In one example, at least one of the first plurality of cuts forms a first rectangular tab projecting from the first edge of the first wall, and at least one of the second plurality of cuts forms a second rectangular tab projecting from the second edge of the first wall.

In one example, the first wall has a first surface configured to face away from the pressure relief valve, the second wall has a second surface configured to face away from the pressure relief valve, and the third wall has a third surface configured to face away from the pressure relief valve. The second and third walls are pivotable to a position in which the second and third surfaces are disposed within the same plane as the first surface.

In one example, the sound insulator further includes a retaining tab projecting from the second wall. The third wall defines an aperture configured to receive the retaining tab. The retaining tab maintains the second and third wall at a nonzero angle relative to the first wall when the retaining tab is inserted into the aperture.

In one example, a fourth wall projects from a third edge of the first wall opposite of the first edge, and a third hinge connects the fourth wall to the third edge of the first wall and allows the fourth wall to pivot about a third pivot axis parallel to the third edge.

In one example, the first, second, and third hinges allow the entire insulator to be folded flat.

The present disclosure also describes a method of making a sound insulator for a pressure relief valve that relieves pressure in a cabin of a vehicle. The method includes making a first cut in a flat sheet of material to define a peripheral edge of a first wall of the sound insulator, making a second cut in the flat sheet of material to define a peripheral edge of a second wall of the sound insulator, and making a third cut in the flat sheet of material to define a peripheral edge of a third wall of the sound insulator. The method further includes making a first plurality of cuts in the flat sheet of material at a first intersection between the first and second walls to form a first hinge between the first and second walls, and making a second plurality of cuts in the flat sheet of material at a second intersection between the first and third walls to form a second hinge between the first and third walls.

In one example, the method further includes making the first cut, the second cut, the third cut, the first plurality of cuts, and the second plurality of cuts using a single die cutting operation.

In one example, the second wall is oriented at a first angle relative to the first wall, the third wall is oriented at a second angle relative to the first wall, and the method further includes folding the second wall about the first hinge to adjust the first angle from zero to a first value greater than zero, and folding the third wall about the second hinge to adjust the second angle from zero to a second value greater than zero.

In one example, the method further includes making a fourth cut in the flat sheet of material to define a peripheral edge of a retaining tab projecting from the second wall, making a fifth cut in the third wall to define an aperture configured to receive the retaining tab, and inserting the retaining tab into the aperture to maintain the first and second angles at the first and second values, respectively.

In one example, the method further includes making a fourth cut in the flat sheet of material to define a fourth peripheral edge of a fourth wall of the sound insulator that is oriented at a third angle relative to the first wall, making a third plurality of cuts at a third intersection between the first and fourth walls to form a third hinge between the first and fourth walls, and folding the fourth wall about the third hinge to adjust the third angle from zero to a third value greater than zero.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Sound insulators for a pressure relief valve are typically formed from a sound insulating material such as foam using a thermoforming process. The thermoforming process compresses the material used to form the sound insulator, which reduces the thickness of the sound insulator. This adversely affects the performance of the sound insulator since the ability of a sound insulator to absorb sound increases as the thickness of a sound insulator increases and vice versa. For example, a sound insulator may lose some absorption capability when its thickness is less than 7 millimeters (mm), and thermoforming a sound insulator may reduce its thickness to 5 mm or less. In addition, thermoforming involves multiple operations (e.g., heating, molding), which add to the cost of the sound insulator. Further, the sound insulator is formed into a three-dimensional (3D) (i.e., not flat) shape, and therefore shipping the sound insulator to a vehicle assembly plant may be costly.

A sound insulator according to the present disclosure formed from a flat sheet of sound insulating material using a single die cutting operation. During the die cutting operation, cuts are made to define the outer peripheries of multiple walls of the sound insulator, and cuts are made to form one or more hinges between the walls. In addition, cuts may be made to define a retaining tab extending from one of the walls and an aperture in another one of the walls. When the sound insulator is initially formed, the sound insulator has a flat shape. To assemble the sound insulator, the walls are pivoted about the hinges and, if present, the retaining tab is inserted into the aperture. As a result, the sound insulator has a 3D shape.

Forming a sound insulator using die cutting instead of thermoforming improves the performance of the sound insulator since die cutting does not reduce the thickness of the sounds insulator. In addition, forming a sound insulator using die cutting instead of thermoforming reduces the number of operations involved in forming the sound insulator, which reduces the cost of the sound insulator. Further, the sound insulator according to the present disclosure may be shipped to an assembly plant in its as-formed flat shape, and then assembled into its final 3D shape at the assembly plant. As a result, the shipping cost associated with the sound insulator may be less than the shipping cost of other sound insulators.

Figure 1:
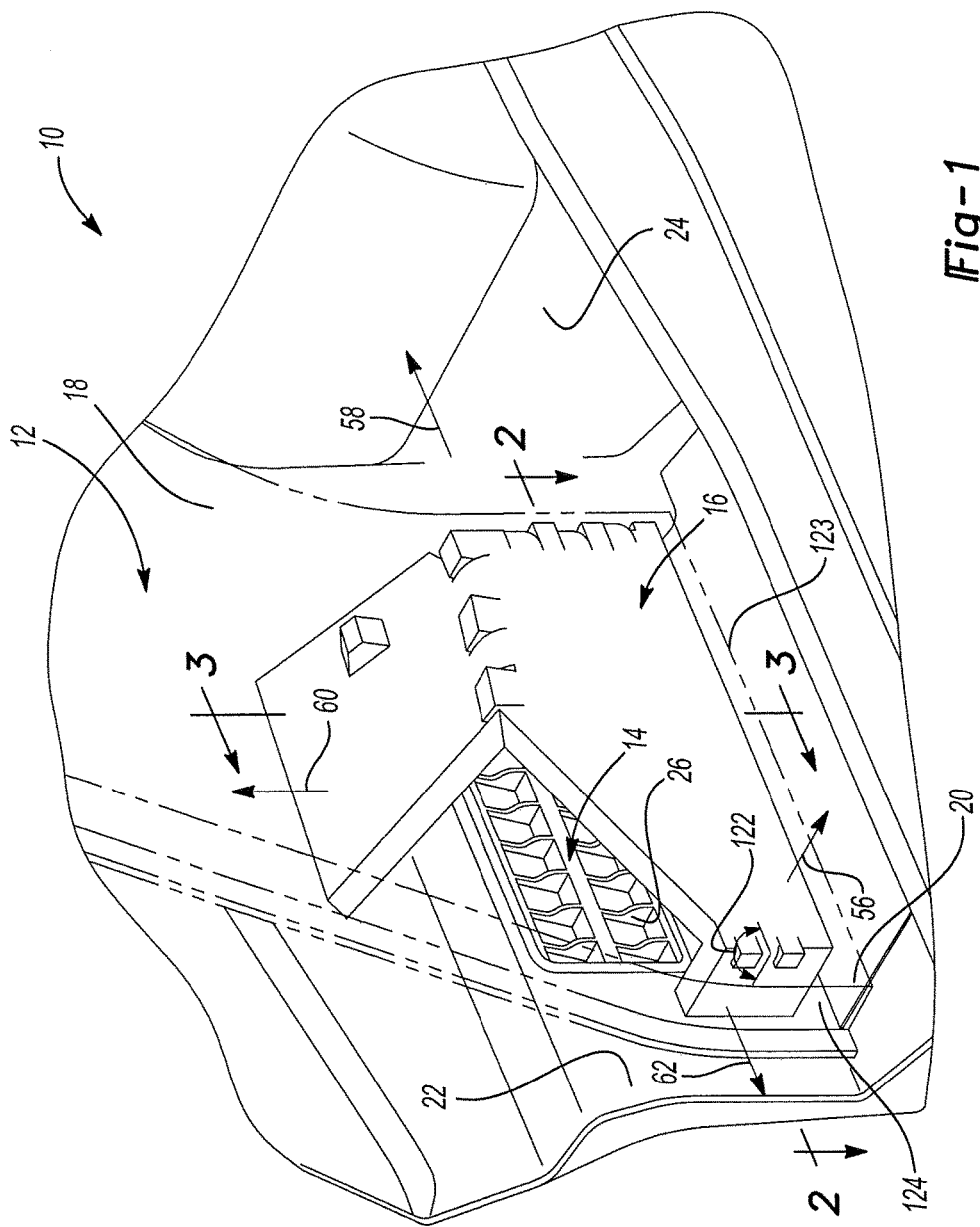
FIG. 1 is a perspective view of a rear body structure in a trunk of a vehicle with a pressure relief valve mounted in the body structure and a pressure relief valve (PRV) insulator of the present disclosure partially enclosing the pressure relief valve.

Referring now to FIG. 1, a vehicle 10 includes a rear body structure 12, a pressure relieve valve 14 secured within an opening in the rear body structure 12, and a PRV insulator 16. In the example shown, the rear body structure 12 encloses a trunk 18 of the vehicle 10 and includes an inner sidewall 20, an outer sidewall 22, and a rear wheelhouse 24 projecting laterally inward from the inner and outer sidewalls 20 and 22. Although the pressure relief valve 14 and the PRV insulator 16 are shown as being mounted in or on the rear body structure 12, the pressure relief valve 14 and the PRV insulator 16 may be mounted at other locations in the vehicle 10. For example, the pressure relief valve 14 and the PRV insulator 16 may be mounted to vehicle body structure enclosing a rear cargo area other than in a trunk or vehicle body structure enclosing a passenger compartment.

The pressure relief valve 14 is configured to relieve pressure in a cabin of the vehicle 10 by allowing air to exit the cabin when the pressure in the cabin is equal to a predetermined pressure. To this end, the cabin includes the trunk 18 and a passenger compartment (not shown), and the trunk 18 is in fluid communication with the passenger compartment. Thus, when a door (not shown) to the passenger compartment or a lid (not shown) of the trunk 18 is shut, the pressure in the cabin increases abruptly. When this occurs, the pressure relief valve 14 opens to allow air to escape the cabin and thereby prevents the pressure in the cabin from exceeding the predetermined pressure.

Figure 2:
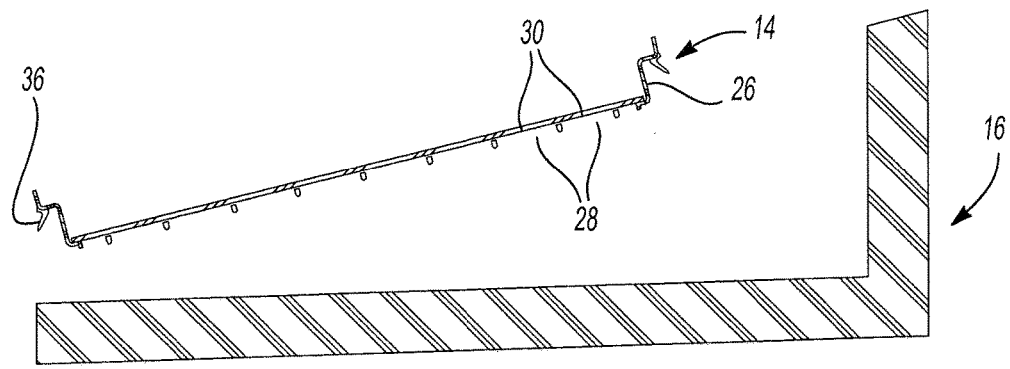
FIG. 2 is a cross-sectional view of the pressure relieve valve and the PRV insulator of FIG. 1 taken along a line 2-2 shown in FIG. 1.
Figure 3:
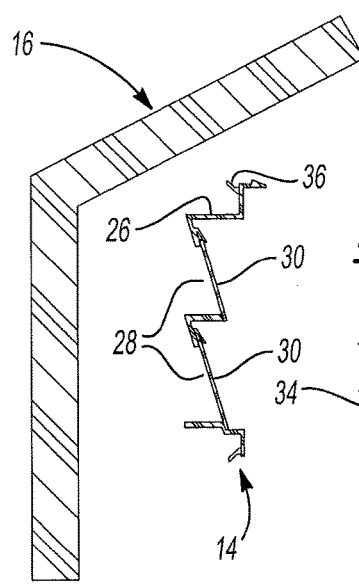
FIG. 3 is a cross-sectional view of the pressure relieve valve and the PRV insulator of FIG. 1 taken along a line 3-3 shown in FIG. 1.

The pressure relief valve 14 may be secured within the opening in the rear body structure 12 using one or more fasteners and/or adhesive. With additional reference to FIGS. 2 and 3, the pressure relief valve 14 includes a lattice structure 26 defining a plurality of openings 28, and a plurality of flaps 30 with each of the flaps 30 covering one of the openings 28. The lattice structure 26 may be made from plastic, and the flaps 30 may be made from plastic and/or rubber. When the pressure in the cabin is less than the predetermined pressure, the flaps 30 are seated against the lattice structure 26 as best shown in FIG. 3. The flaps 30 may be biased in a first direction 32 toward the lattice structure 26 due to the material and/or geometry of the flaps 30.

When the pressure in the cabin is greater than or equal to the predetermined pressure, the flaps 30 move in a second direction 34 away from the lattice structure 26 and thereby allow air to escape the cabin through the openings 28. The second direction 34 is opposite of the first direction 32. The pressure relief valve 14 may also include a gasket 36 that extends around the perimeter of the pressure relief valve 14 and seals the interface between the pressure relieve valve 14 and the rear body structure 12. The gasket 36 prevents air from escaping the cabin through the interface between the pressure relieve valve 14 and the rear body structure 12 rather than through the openings 28. Thus gasket 36 may be made from rubber.

Figure 4:
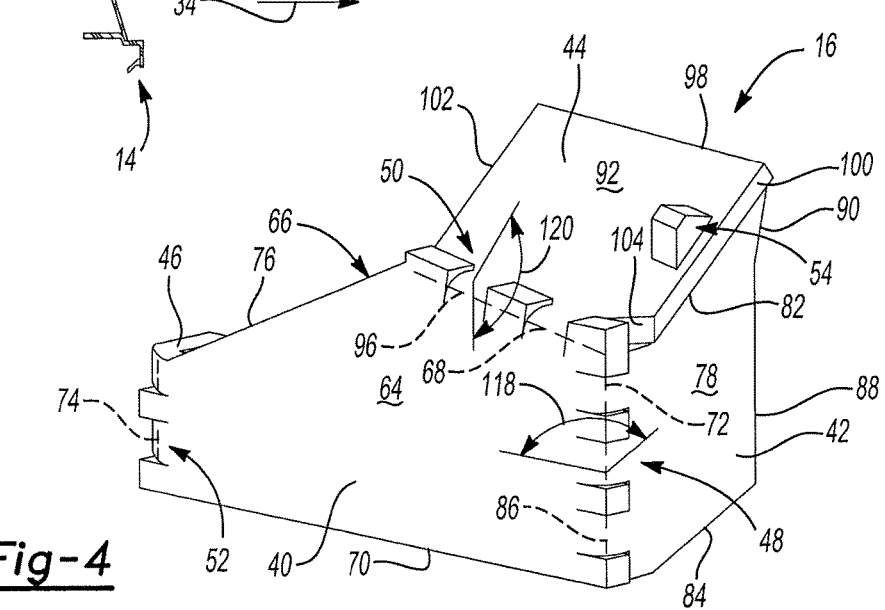
FIG. 4 is another perspective view of the PRV insulator of FIG. 1.
Figure 5:
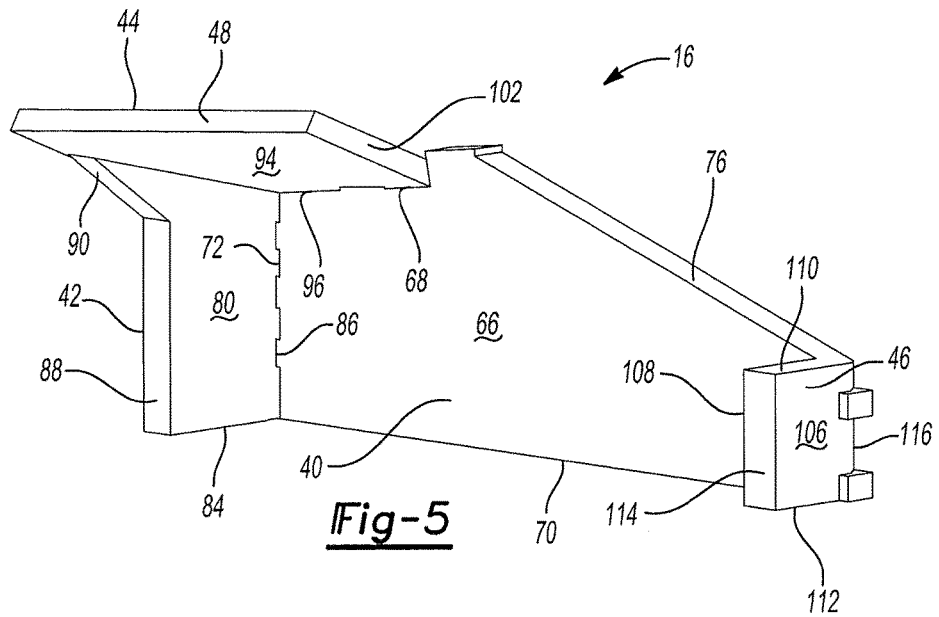
FIG. 5 is another perspective view of the PRV insulator of FIG. 1.

The PRV insulator 16 is configured to inhibit exterior sounds (e.g., road noise) from entering the passenger compartment of the vehicle 10 through the pressure relieve valve 14. The PRV insulator 16 can be made from a sound insulating material such as a natural fiber material (e.g., recycled cotton or wool), foam, and/or plastic. Referring now to FIGS. 1, 4, and 5, the PRV insulator 16 includes a first wall 40, a second wall 42, a third wall 44, a fourth wall 46, a first hinge 48, a second hinge 50, a third hinge 52, and a retaining tab 54. The second, third, and fourth walls 42, 44, and 46 project laterally outward from the first wall 40.

The first wall 40 is configured to inhibit sound from travelling in a laterally inward direction 56 from the pressure relieve valve 14 to the passenger compartment. The second wall 42 is configured to inhibit sound from travelling in a first longitudinal (e.g., forward) direction 58 from the pressure relieve valve 14 to the passenger compartment. The third wall 44 is configured to inhibit sound from travelling in a vertical (e.g., upward) direction 60 from the pressure relieve valve 14 to the passenger compartment. The fourth wall 46 is configured to inhibit sound from travelling in a second longitudinal (e.g., rearward) direction 62 from the pressure relieve valve 14 to the passenger compartment.

The first wall 40 has an inner surface 64 configured to face away from the pressure relief valve 14 and an outer surface 66 opposite of the inner surface 64. In addition, the first wall 40 has an upper edge 68, a lower edge 70, a front edge 72, a rear edge 74, and an angled edge 76 extending between the upper edge 68 and the rear edge 74. The second wall 42 has a front surface 78 configured to face away from the pressure relief valve 14 and a rear surface 80 opposite of the front surface 78. In addition, the second wall 42 has an upper edge 82, a lower edge 84, an inner edge 86, an outer edge 88, and an angled edge 90 extending between the upper edge 82 and the outer edge 88.

The third wall 44 has a top surface 92 configured to face away from the pressure relief valve 14 and a bottom surface 94 opposite of the front surface 92. In addition, the third wall 44 has an inner edge 96, an outer edge 98, a front edge 100, a rear edge 102, and an angled edge 104 extending between the inner edge 96 and the front edge 100. The fourth wall 46 has a rear surface 106 configured to face away from the pressure relief valve 14 and a front surface 108 opposite of the front surface 106. In addition, the fourth wall 46 has an upper edge 110, a lower edge 112, an inner edge 114, and an outer edge 116.

Figure 6:
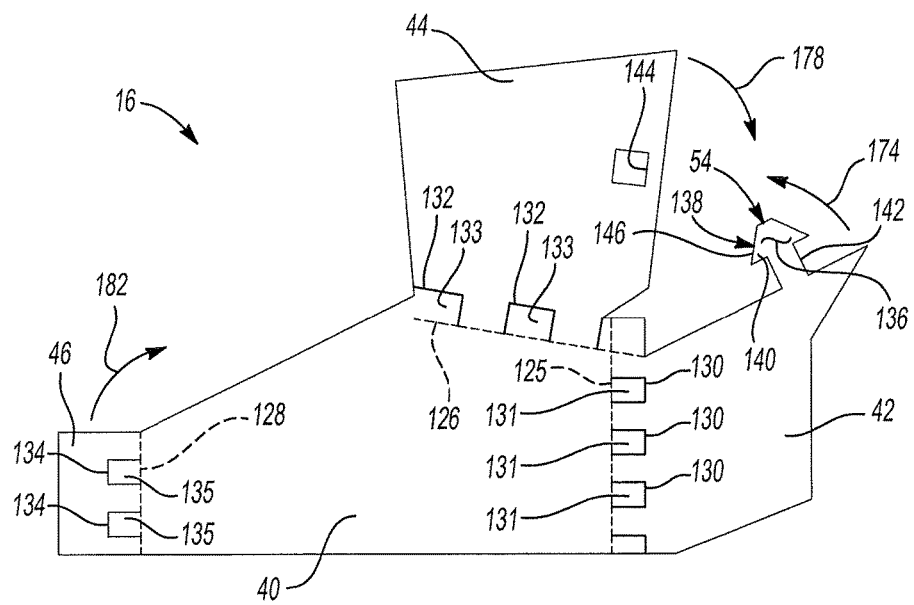
FIG. 6 is front view of the PRV insulator of FIG. 1 in its disassembled state.

As shown in FIG. 4, the front surface 78 of the second wall 42 is oriented at a first angle 118 relative to the inner surface 64 of the first wall 40, and the top surface 92 of the third wall 44 is oriented at a second angle 120 relative to the inner surface 64 of the first wall 40. In addition, the rear surface 108 of the fourth wall 46 is oriented at a third angle 122 (FIG. 1) relative to the inner surface 64 of the first wall 40. When the PRV insulator 16 is assembled as shown in FIGS. 1, 4, and 5, the first angle 118 has a first value less than 90 degrees, the second angle 120 has a second value greater than 90 degrees, and the third angle 122 has a third value greater than 90 degrees. In one example, the first value is 88 degrees, the second value is 130 degrees, and the third value is 120 degrees. When the PRV insulator 16 is initially formed and not yet assembled as shown in FIG. 6, the first, second, and third angles 118, 120, and 122 are equal to zero. Thus, the inner surface 64 of the first wall 40, the front surface 78 of the second wall 42, the top surface 92 of the third wall 44, and the rear surface 108 of the fourth wall 46 are disposed within the same plane.

Referring again to FIG. 1, the PRV insulator 16 is held in place between the inner sidewall 20, the outer sidewall 22, and the rear wheelhouse 24 due to engagement with each of these components. For example, the rear wheelhouse 24 engages the front surface 78 of the second wall 42 to prevent the PRV insulator 16 from moving in the first longitudinal (e.g., forward) direction 58. A front portion 123 of the inner sidewall 20 engages the inner surface 64 of the first wall 40 to prevent the PRV insulator 16 from moving in the laterally inward direction 56. A rear portion 124 of the inner sidewall 20 engages the rear surface 108 of the fourth wall 46 to prevent the PRV insulator 16 from moving in the second longitudinal (e.g., rearward) direction 62. The outer sidewall 22 engages the outer edges of the second and fourth walls 42 and 46 to prevent the PRV insulator from moving in a laterally outward direction opposite of the laterally inward direction 56. In addition, the outer edge 98 of the third wall 44 may be inserted into a corresponding slot (not shown) in the outer sidewall 22 to hold the PRV insulator 16 in place in the vertical direction 60.

Referring now to FIG. 6, the first hinge 48 connects the inner edge 86 of the second wall 42 to the front edge 72 of the first wall 40 and allows the second wall 42 to pivot about a first pivot axis 125 parallel to and/or in the same plane as the front edge 72. The second hinge 50 connects the inner edge 96 of the third wall 44 to the upper edge 68 of the first wall 40 and allows the third wall 44 to pivot about a second pivot axis 126 parallel to and/or in the same plane as the upper edge 68. The third hinge 52 connects the inner edge 114 of the fourth wall 46 to the rear edge 74 of the first wall 40 and allows the fourth wall 46 to pivot about a third pivot axis 128 parallel to and/or in the same plane as the rear edge 74.

The first hinge 48 is formed by a first plurality of cuts 130 in the first and second walls 40 and 42 at the intersection between the first and second walls 40 and 42. The first plurality of cuts 130 form a first plurality of rectangular tabs 131 projecting from the front edge 72 of the first wall 40. The second hinge 50 is formed by a second plurality of cuts 132 in the first and third walls 40 and 44 at the intersection between the first and third walls 40 and 44. The second plurality of cuts 132 form a second plurality of rectangular tabs 133 projecting from the upper edge 68 of the first wall 40. The third hinge 52 is formed by a third plurality of cuts 134 in the first and fourth walls 40 and 44 at the intersection between the first and fourth walls 40 and 44. The third plurality of cuts 134 form a third plurality of rectangular tabs 135 projecting from the rear edge 74 of the first wall 40.

Referring still to FIG. 6, the retaining tab 54 projects from the angled edge 76 of the second wall 42. The retaining tab 54 has a front surface 136 configured to face away from the pressure relief valve 14 and a rear surface 138 opposite of the front surface 136. The front surface 136 of the retaining tab 54 is coplanar with the front surface 78 of the second wall 42, and the rear surface 138 of the retaining tab 54 is coplanar with the rear surface 80 of the second wall 42.

The retaining tab 54 includes a head 140 and a neck 142. The third wall 44 defines an aperture 144 that receives the retaining tab 54. During assembly, the retaining tab 54 is inserted into the aperture 144 until the head 140 is completely through the aperture 144. The head 140 of the retaining tab 54 has a tapered outer profile 146 that reduces the effort required to insert the head 140 through the aperture 144. The head 140 may be compressed as the retaining tab 54 is inserted into the aperture 144, and then expand into its relaxed shape shown in FIG. 6 after the head 140 is inserted past the aperture 144. When the retaining tab 54 is inserted into the aperture 144 as shown in FIG. 4, the retaining tab 54 maintains each of the first, second, and third angles at the first, second, and third values, respectively.

Figure 7:
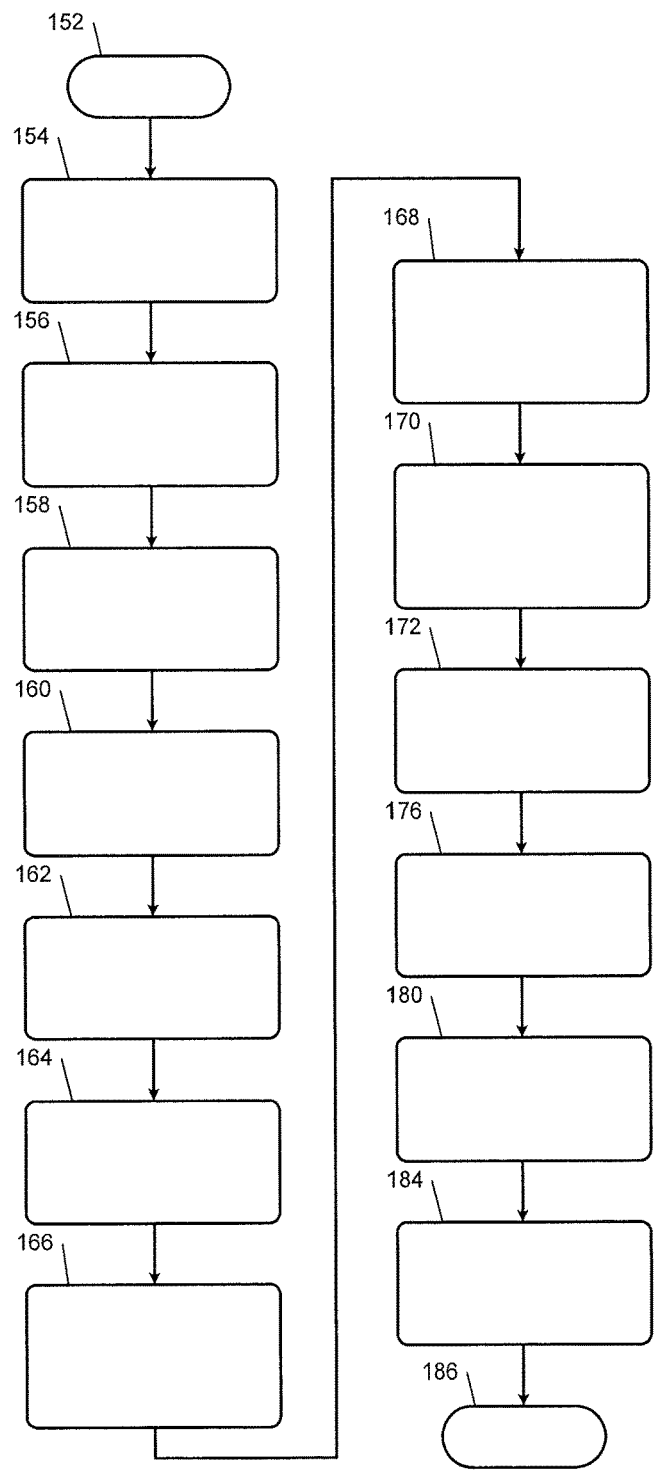
FIG. 7 is a flowchart illustrating a method of making the PRV insulator of FIG. 1.

Referring now to FIG. 7, a method for making the PRV insulator 16 begins at 152. At 154, a first cut is made in a flat sheet of material to define the peripheral edge of the first wall 40 of the PRV insulator 16. The peripheral edge of the first wall 40 consists of the lower edge 70 and the angled edge 76. At 156, a second cut is made in the flat sheet of material to define the peripheral edge of the second wall 42 of the PRV insulator 16. The peripheral edge of the second wall 42 consists of the upper edge 82, the lower edge 84, the outer edge 88, and the angled edge 90.

At 158, a third cut is made in the flat sheet of material to define the peripheral edge of the third wall 44 of the PRV insulator 16. The peripheral edge of the third wall 44 consists of the outer edge 98, the front edge 100, the rear edge 102, and the angled edge 104. At 160, a fourth cut is made in the flat sheet of material to define the peripheral edge of the fourth wall 46 of the PRV insulator 16. The peripheral edge of the fourth wall 46 consists of the upper edge 110, the lower edge 112, and the outer edge 116

At 162, a fifth cut is made in the flat sheet of material to define the peripheral edge of the retaining tab 54 projecting from the second wall 42. The peripheral edge of the retaining tab 54 includes the tapered outer profile 146. At 164, a sixth cut is made in the third wall 44 to define the aperture 144 in the third wall 44 that is configured to receive the retaining tab 54.

At 166, the first plurality of cuts 130 are made in the flat sheet of material at the intersection between the first and second walls 40 and 42 to form the first hinge 48. At 168, the second plurality of cuts 132 are made in the flat sheet of material at the intersection between the first and third walls 40 and 44 to form the second hinge 50. At 170, the third plurality of cuts 134 are made in the flat sheet of material at the intersection between the first and fourth walls 40 and 46 to form the third hinge 52.

The cuts made in the flat sheet of material at 154, 156, 158, 160, 162, 164, 166, 168, and 170 may be made in a single die cutting operation and/or using a single cutting die. Once all of these cuts are made in the flat sheet of material, the PRV insulator 16 has a flat shape as shown in FIG. 6. When the PRV insulator 16 has this flat shape, the PRV insulator 16 may be shipped to an assembly plant before the remainder of the method of FIG. 7 is executed.

Referring now to FIGS. 6 and 7, at 172, the second wall 42 is folded about the first hinge 48 in a third direction 174 to adjust the first angle 118 from zero to the first value. At 176, the third wall 44 is folded about the second hinge 50 in a fourth direction 178 to adjust the second angle 120 from zero to the second value. At 180, the fourth wall 46 is folded about the third hinge 52 in a fifth direction 182 to adjust the third angle 122 from zero to the third value.

At 184, the retaining tab 54 is inserted into the aperture 144 in the third wall 44 to maintain the first and second angles 118 and 120 at the first and second values, respectively. At this point, the PRV insulator 116 has the 3D shape shown in FIGS. 1, 4, and 5, and therefore the method ends at 186. Of course, the PRV insulator 116 may be returned to its flat state shown in FIG. 4 by undoing the actions taken at 172, 174, 176, 180, and 184.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A sound insulator for a pressure relief valve that relieves pressure in a cabin of a vehicle, the sound insulator comprising:

a first wall configured to inhibit sound from travelling in a lateral direction from the pressure relieve valve to a passenger compartment in the vehicle cabin;

a second wall projecting from the first wall and configured to inhibit sound from travelling in a first longitudinal direction from the pressure relieve valve to the passenger compartment, the second wall being oriented at a first angle relative to the first wall; and a third wall projecting from the first wall and configured to inhibit sound from travelling in a vertical direction from the pressure relieve valve to the passenger compartment, the third wall being oriented at a second angle relative to the first wall, wherein the first and second angles are adjustable without damaging the sound insulator.

2. The sound insulator of claim 1 the first and second angles are zero when the sound insulator is formed.

3. The sound insulator of claim 1 wherein the first wall has a first surface configured to face away from the pressure relief valve, the second wall has a second surface configured to face away from the pressure relief valve and oriented at the first angle relative to the first surface, and the third wall has a third surface configured to face away from the pressure relief valve and oriented at the second angle relative to the first surface.

4. The sound insulator of claim 1 further comprising:

a first hinge connecting the second wall to the first wall and allowing the second wall to pivot relative to the first wall, wherein pivoting the second wall relative to the first wall changes the first angle; and a second hinge connecting the third wall to the first wall and allowing the third wall to pivot relative to the first wall, wherein pivoting the third wall relative to the first wall changes the second angle.

5. The sound insulator of claim 4 wherein:

the first hinge is defined by a first plurality of cuts in at least one of the first and second walls at a first intersection between the first and second walls; and the second hinge is defined by a second plurality of cuts in at least one of the first and third walls at a second intersection between the first and third walls.

6. The sound insulator of claim 1 further comprising a retaining tab projecting from the second wall, wherein the third wall defines an aperture configured to receive the retaining tab, the retaining tab maintaining each of the first and second angles at a nonzero value when the retaining tab is inserted into the aperture.

7. The sound insulator of claim 6 wherein, when the retaining tab projecting from the second wall is inserted into the aperture in the third wall, the first angle is less than 90 degrees and the second angle is greater than 90 degrees.

8. The sound insulator of claim 1 further comprising a fourth wall projecting from the first wall and configured to inhibit sound from travelling from the pressure relieve valve to the passenger compartment in a second longitudinal direction opposite of the first longitudinal direction.

9. A sound insulator for a pressure relief valve that relieves pressure in a cabin of a vehicle, the sound insulator comprising:

a first wall having a first edge and a second edge intersecting the first edge;

a second wall projecting from the first edge of the first wall;

a third wall projecting from the second edge of the first wall;

a first hinge connecting the second wall to the first edge of the first wall and allowing the second wall to pivot about a first pivot axis parallel to the first edge; and a second hinge connecting the third wall to the second edge of the first wall and allowing the third wall to pivot about a second pivot axis parallel to the second edge.

10. The sound insulator of claim 9 wherein:

the first hinge is defined by a first plurality of cuts in at least one of the first and second walls at a first intersection between the first and second walls; and the second hinge is defined by a second plurality of cuts in at least one of the first and third walls at a second intersection between the first and third walls.

11. The sound insulator of claim 10 wherein:

at least one of the first plurality of cuts forms a first rectangular tab projecting from the first edge of the first wall; and at least one of the second plurality of cuts forms a second rectangular tab projecting from the second edge of the first wall.

12. The sound insulator of claim 9 wherein the first wall has a first surface configured to face away from the pressure relief valve, the second wall has a second surface configured to face away from the pressure relief valve, and the third wall has a third surface configured to face away from the pressure relief valve, the second and third walls being pivotable to a position in which the second and third surfaces are disposed within the same plane as the first surface.

13. The sound insulator of claim 9 further comprising a retaining tab projecting from the second wall, wherein the third wall defines an aperture configured to receive the retaining tab, the retaining tab maintaining the second and third wall at a nonzero angle relative to the first wall when the retaining tab is inserted into the aperture.

14. The sound insulator of claim 9 further comprising:

a fourth wall projecting from a third edge of the first wall opposite of the first edge; and a third hinge connecting the fourth wall to the third edge of the first wall and allowing the fourth wall to pivot about a third pivot axis parallel to the third edge.

15. The sound insulator of claim 14 wherein the first, second, and third hinges allow the entire insulator to be folded flat.

16. A method of making a sound insulator for a pressure relief valve that relieves pressure in a cabin of a vehicle, the method comprising:

making a first cut in a flat sheet of material to define a peripheral edge of a first wall of the sound insulator;

making a second cut in the flat sheet of material to define a peripheral edge of a second wall of the sound insulator;

making a third cut in the flat sheet of material to define a peripheral edge of a third wall of the sound insulator;

making a first plurality of cuts in the flat sheet of material at a first intersection between the first and second walls to form a first hinge between the first and second walls; and making a second plurality of cuts in the flat sheet of material at a second intersection between the first and third walls to form a second hinge between the first and third walls.

17. The method of claim 16 further comprising making the first cut, the second cut, the third cut, the first plurality of cuts, and the second plurality of cuts using a single die cutting operation.

18. The method of claim 16 wherein the second wall is oriented at a first angle relative to the first wall, and the third wall is oriented at a second angle relative to the first wall, the method further comprising:

folding the second wall about the first hinge to adjust the first angle from zero to a first value greater than zero; and folding the third wall about the second hinge to adjust the second angle from zero to a second value greater than zero.

19. The method of claim 18 further comprising:

making a fourth cut in the flat sheet of material to define a peripheral edge of a retaining tab projecting from the second wall;

making a fifth cut in the third wall to define an aperture configured to receive the retaining tab; and inserting the retaining tab into the aperture to maintain the first and second angles at the first and second values, respectively.

20. The method of claim 16 further comprising:

making a fourth cut in the flat sheet of material to define a fourth peripheral edge of a fourth wall of the sound insulator that is oriented at a third angle relative to the first wall;

making a third plurality of cuts at a third intersection between the first and fourth walls to form a third hinge between the first and fourth walls; and folding the fourth wall about the third hinge to adjust the third angle from zero to a third value greater than zero.

* * * * *